United States Patent
An et al.

(10) Patent No.: US 11,132,513 B2
(45) Date of Patent: Sep. 28, 2021

(54) ATTENTION-BASED NATURAL LANGUAGE PROCESSING

(71) Applicant: International Business Machines Corporation, Armonk, NY (US)

(72) Inventors: Bang An, Beijing (CN); Shiwan Zhao, Beijing (CN); HongLei Guo, Beijing (CN); Zhong Su, Beijing (CN); Zhi Hu Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 16/405,393

(22) Filed: May 7, 2019

(65) Prior Publication Data

US 2020/0356628 A1    Nov. 12, 2020

(51) Int. Cl.
*G06F 40/211* (2020.01)
*G06F 40/35* (2020.01)
(Continued)

(52) U.S. Cl.
CPC ............ *G06F 40/35* (2020.01); *G06F 40/211* (2020.01); *G06F 40/284* (2020.01); *G06N 3/08* (2013.01); *G06F 16/3344* (2019.01); *G06F 40/30* (2020.01)

(58) Field of Classification Search
CPC ..... G06F 16/3344; G06F 40/211; G06F 40/30
See application file for complete search history.

(56) References Cited

U.S. PATENT DOCUMENTS

| 6,701,483 B1* | 3/2004 | Heegard ............... H03M 13/39 714/791 |
| 2008/0037870 A1* | 2/2008 | Knee ........................ G06T 7/11 382/173 |

(Continued)

FOREIGN PATENT DOCUMENTS

| CN | 107578106 | | 1/2018 |
| CN | 109062907 | A | 12/2018 |
| CN | 109145315 | A | 1/2019 |

OTHER PUBLICATIONS

Petar Velikovi, et al., 2018. Graph attention networks. In International Conference on Learning Representations. (Year: 2018).*

(Continued)

*Primary Examiner* — Feng-Tzer Tzeng
(74) *Attorney, Agent, or Firm* — Patterson + Sheridan, LLP

(57) ABSTRACT

Embodiments of the present disclosure relate to attention-based neural language processing. In an embodiment, a method is disclosed. According to the method, a sentence graph is generated from a sentence containing words. The sentence graph comprises nodes representing words and edges connecting the nodes, at least one of the edges being constructed to indicate a syntactic relationship between words represented by nodes connected therebetween. Word representations for the words are determined based on the sentence graph by applying an attention mechanism on respective ones of the nodes and respective sets of neighbor nodes for the nodes. A set of neighbor nodes for a node has edges connected to the node. A sentence representation for the sentence is determined based on the word representations for use in a natural language processing task related to the sentence. In other embodiments, a system and a computer program product are disclosed.

20 Claims, 6 Drawing Sheets

(51) Int. Cl.
*G06N 3/08* (2006.01)
*G06F 40/284* (2020.01)
*G06F 16/33* (2019.01)
*G06F 40/30* (2020.01)

(56) References Cited

U.S. PATENT DOCUMENTS

| | | | |
|---|---|---|---|
| 2009/0132989 A1* | 5/2009 | Ou | G06F 30/394 |
| | | | 716/129 |
| 2011/0270604 A1* | 11/2011 | Qi | G06F 16/3344 |
| | | | 704/9 |
| 2015/0261886 A1* | 9/2015 | Wu | G06F 16/285 |
| | | | 707/798 |
| 2017/0235824 A1 | 8/2017 | Liu | |
| 2017/0364503 A1 | 12/2017 | Anisimovich et al. | |
| 2018/0013699 A1 | 1/2018 | Sapoznik et al. | |
| 2018/0189269 A1 | 7/2018 | Quirk et al. | |
| 2018/0373682 A1 | 12/2018 | McCann et al. | |
| 2018/0373701 A1 | 12/2018 | McAteer et al. | |
| 2019/0050875 A1 | 2/2019 | McCord | |
| 2019/0066660 A1 | 2/2019 | Liang et al. | |
| 2020/0104366 A1* | 4/2020 | Xu | G06F 16/3335 |
| 2020/0265196 A1 | 8/2020 | Ravi et al. | |
| 2020/0327285 A1 | 10/2020 | Cox et al. | |

OTHER PUBLICATIONS

Tao Ji, et al. Graph-based Dependency Parsing with Graph Neural Networks, Proceedings of the 57th Annual Meeting of the Association for Computational Linguistics, Jul. 28-Aug. 2, 2019. (Year: 2019).*

Li, et al. "Information Aggregation for Multi-Head Attention with Routing-by-Agreement," Apr. 2019. (Year: 2019).*

Velickovic, et al., "Graph Attention Networks," International Conference on Learning Representations, 2018 (copy available in the previous Office action). (Year: 2018).*

Li, et al., "Information Aggregation for Multi-Head Attention with Routing-by-Agreement," cs_CL, Apr. 2019 (copy available in the previous Office action). (Year: 2019).*

Cho et al., ". Learning Phrase Representations Using RNN Encoder-Decoder for Statistical Machine Translation," Submitted on Jun. 3, 2014, 15 pages.

Vaswani et al., "Attention Is All You Need," arXiv:1706.03762v5 [cs.CL] Dec. 6, 2017, 15 pages.

Alexis et al., "Supervised Learning of Universal Sentence Representations from Natural Language Inference Data," Jul. 8, 2018, 12 pages.

Chen et al.,"Recurrent Neural Network-Based Sentence Encoder with Gated Attention for Natural Language Inference," arXiv:1708.01353v1 [cs.CL] Aug. 4, 2017, 5 pages.

Tay et al., "Compare, Compress and Propagate: Enhancing Neural Architectures with Alignment Factorization for Natural Language Inference," arXiv:1801.00102v2 [cs.CL] Sep. 10, 2018, 11 pages.

Michael T. Mills and Nikolaos G. Bourbakis,."Graph-Based Methods for Natural Language Processing and Understanding—A Survey and Analysis," IEEE Transactions on Systems, Man, and Cybernetics: Systems, vol. 44, No. 1, Jan. 2014, 13 pages.

U.S. Appl. No. 16/405,393, "Attention-Based Natural Language Processing,", filed May 7, 2019.

IBM, "List of IBM Patents or Patent Applications Treated As Related ," for U.S. Appl. No. 16/405,393, filed May 7, 2019.

* cited by examiner

ATTENTION-BASED NATURAL LANGUAGE PROCESSING

BACKGROUND

The present invention relates to natural language processing, and more specifically, to attention-based natural language processing.

Many natural language processing tasks involve transforming an input sentence with words in an ordered sequence into a specific output. For example, a machine translation task may map a text sequence in a source natural language to a translated text sequence, which expresses the same semantic meaning in a target natural language. As part of processing the input sentence, a sentence representation is generated to characterize semantic information within the sentence so as to facilitate obtaining the result of the output. Various language analysis/synthesis approaches have been used to analyze a sentence, extract information from the sentence to form a sentence representation for post processing.

SUMMARY

In a first aspect, one embodiment of the present invention provides a computer-implemented method. According to the method, a sentence graph is generated from a sentence containing a plurality of words. The sentence graph comprises nodes representing the plurality of words and edges connecting the nodes, at least one of the edges being constructed to indicate a syntactic relationship between words represented by nodes connected therebetween. Word representations for the plurality of words are determined based on the sentence graph by applying an attention mechanism on respective ones of the nodes and respective sets of neighbor nodes for the nodes. A set of neighbor nodes for a node has edges connected to the node. A sentence representation for the sentence is determined based on the word representations for use in a natural language processing task related to the sentence.

In a second aspect, a further embodiment of the present invention provides a system. The system comprises a processing unit; and a memory coupled to the processing unit and storing instructions thereon. The instructions, when executed by the processing unit, perform acts of the method according to the above first aspect.

In a third aspect, a yet further embodiment of the present invention provides a computer program product. The computer program product comprises a computer readable storage medium having program instructions embodied therewith, the program instructions executable by an electronic device to cause the electronic device to perform acts of the method according to the above first aspect.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
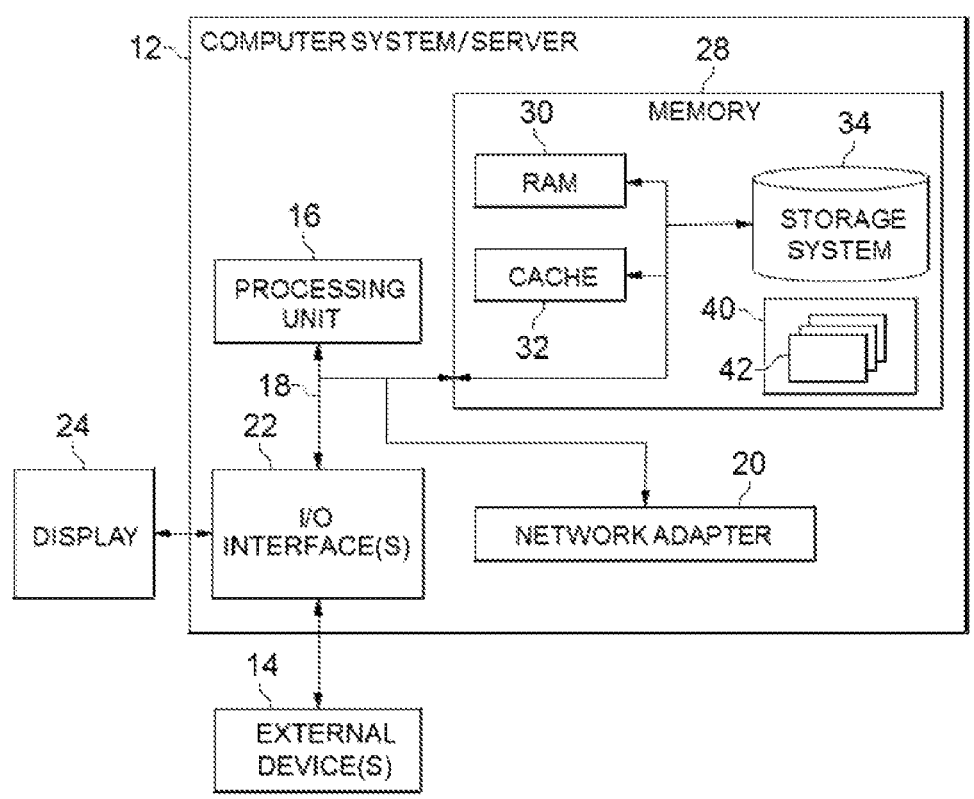
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
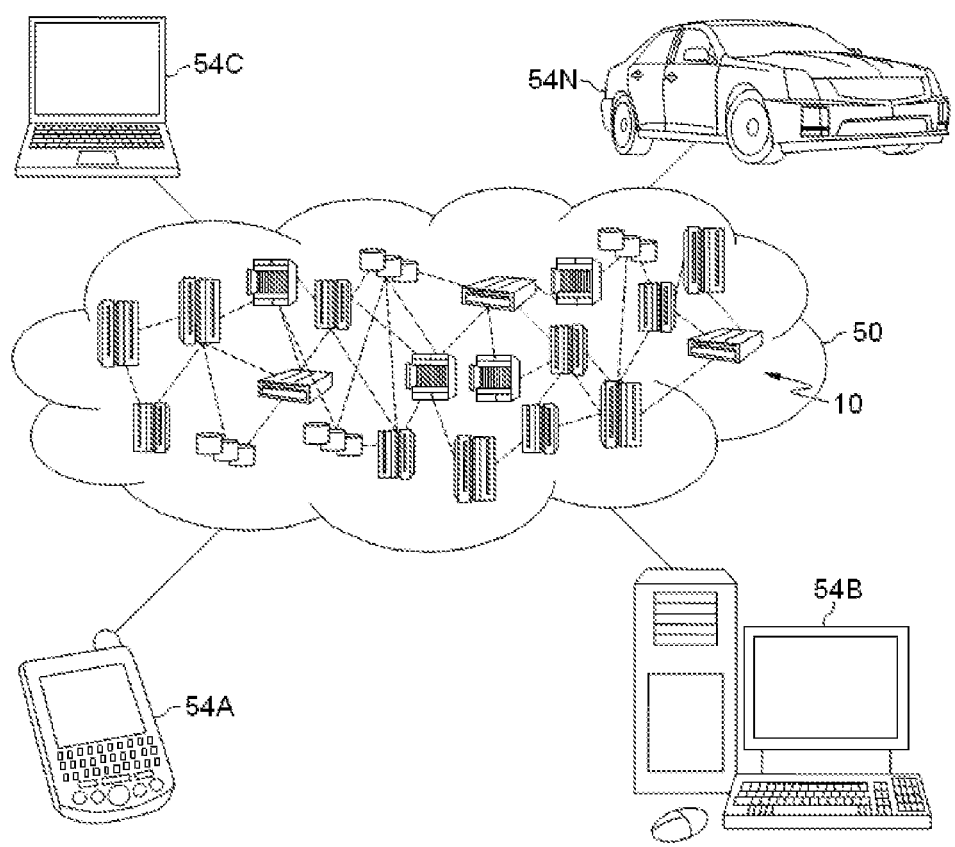
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
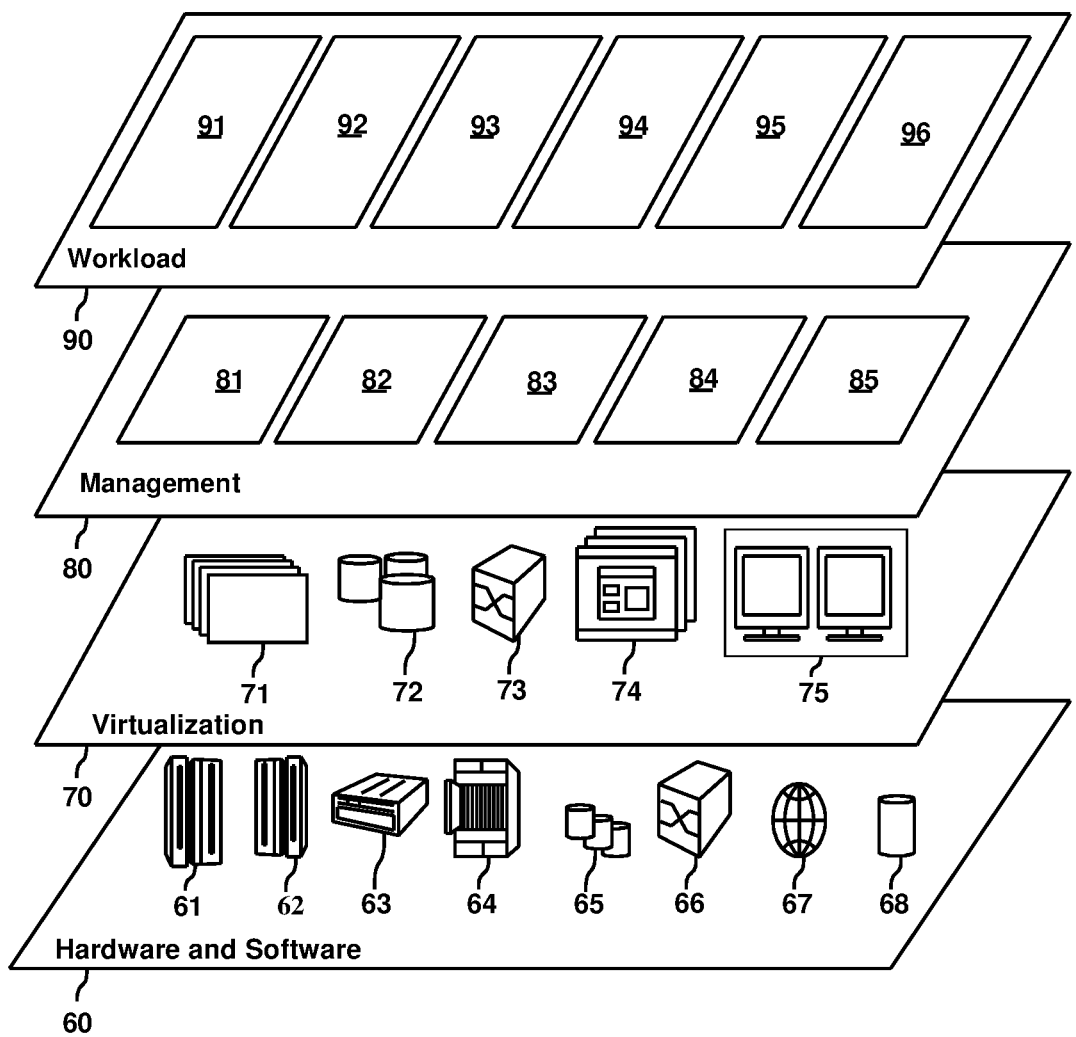
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and nature language processing 96. The functionalities of nature language processing will be described in the following embodiment of the present disclosure.

Figure 4:
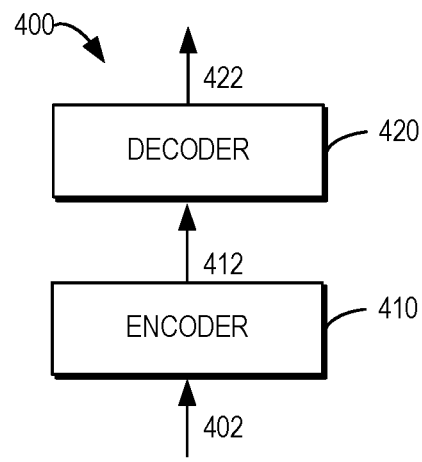
FIG. 4 depicts a block diagram of a system for natural language processing in which embodiments of the present invention can be implemented.

FIG. 4 illustrates a block diagram of a system 400 for natural language processing in which embodiments of the present invention can be implemented. The system 400 has an encoder-decoder structure, including an encoder 410 and a decoder 420. The encoder 410 encodes an input sentence 210 including a plurality of words to a sentence representation 412. The sentence representation 412 is a real-valued representation of the input sentence 402, which characterizes semantic information embedded within the input sentence 402.

Given the sentence representation 412, the decoder 420 then generates an output 422. Depending on the specific natural language processing task to be performed by the system 400, the decoder 420 processes the sentence representation 412 to obtain the corresponding output 422. For example, in a machine translation task, the decoder 410 determines, based on the sentence representation 412, an output sentence which has a same semantic meaning in a target natural language to the input sentence 402 in its source natural language. In a natural language inference (NLI) task, the decoder 420 can determine whether the input sentence 402 semantically entails another input sentence based on sentence representations determined by the encoder 410 for the two input sentences. As a further example, the decoder 420 can label semantic roles or recognize entities of a knowledge base in the input sentence 402 based on the sentence representation 412. Other natural language processing tasks may include text summarization, reading comprehension, relation extraction, and so on. The scope of the embodiments in the present invention is not limited in this regard.

The encoder 410 and decoder 420 may be implemented using neural networks. Neural networks are machine learning models that employ one or more layers of nonlinear units to predict an output for a received input. Some neural networks include one or more hidden layers in addition to an output layer. The output of each hidden layer is used as input to the next layer in the network, which may be the next hidden layer or the output layer. Each layer of the network generates an output from a received input in accordance with current values of a respective set of parameters. The values of the parameters used in the network may be learned during a training process using training data. The encoder 410 and the decoder 420 may be trained in an end-to-end manner to learn the values of their parameters. As such, the encoder 410 can generate a task-dependent sentence representation for use in the decoder 420.

In some embodiments, attention mechanisms may be applied in the encoder 410 and/or optionally applied in the decoder 420. The attention mechanism can be applied in the encoder 410 to explore the input sentence 402 so as to focus on the most relevant parts of the input sentence 402 to make decision, i.e., to determine the sentence representation 412. When an attention mechanism is used to compute a representation of an input sentence, it is commonly referred to as self-attention or intra-attention, which can relate different positions of a single sequence in order to compute a sentence representation. The attention module 414 can directly capture a relationship between two words regardless of their distance in the input sentence and learn the inherent structure of the sentence.

In some embodiments, the decoder 420 may optionally apply an attention mechanism to explore the sentence representation 412 so as to focus on the most relevant parts of the sentence representation for determination of the output 422. The work principle of the attention mechanism applied in the decoder 420 may be similar as that in the encoder 410 although their inputs are different.

In conventional attention-based neural networks, the attention mechanism directly models relationships between every two of the words in a sentence regardless of their respective positions, which may result in high computation complexity, for example, $O(n^2)$ where n represents the total number of words in the sentence. To reduce the computation cost of long sentences, some restricted versions have been proposed with an assumption that the current word is related to the nearby r words, which needs $O(nr)$ computation. However, r is a hyperparameter which is not easy to decide. In addition, with the fixed value of r, it is possible to obtain long-term dependency of words in some sentences. On the other hand, although position embedding can be used, the position information cannot be modeled and syntactic information is out of consideration in the neural networks. Thus, such attention-based neural networks cannot perform well on some natural language processing tasks, especially sequence annotation tasks such as semantic role labeling, entity recognition, and the like.

According to embodiments of the present disclosure, there is proposed an improved solution for natural language processing. According to this solution, a sentence graph is generated from a sentence to represent words in the sentence as nodes and connect the nodes by edges that represent at least syntactic relationships between the words. Word representations for the words are determined based on the sentence graph by applying an attention mechanism on respective ones of the nodes and respective sets of neighbor nodes for the nodes. The set of neighbor nodes for a given node includes node having edges connected to the given node in the sentence graph. A sentence representation then can be determined based on the word representations.

Instead of performing attention of every two words in a sentence, in this solution, an attention mechanism is applied based on at least the synaptic relationships between the words by leveraging the sentence graph. It can thus lower computation cost and leverage syntactic information of the sentence. In addition, such attention mechanism may be more suitable for long sentences comparing with the restricted version of attention which focuses on a fixed number of adjacent words for a current word.

Example embodiments of the present invention will be described in details below with reference to the figures. Some example embodiments of the present invention can be applicable in an encoder of a natural language processing system, such as the encoder 410 of the system 400 in FIG. 4 to determine a sentence representation for an input sentence. For purpose of illustration, the following description will be described with reference to FIG. 4.

Figure 5:
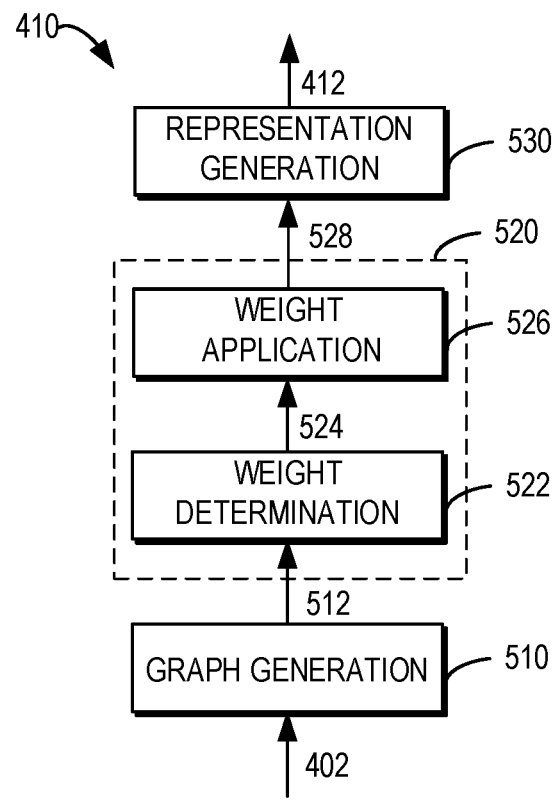
FIG. 5 depicts a block diagram of an encoder of the system of FIG. 4 according to an embodiment of the present invention.

FIG. 5 illustrates a block diagram of the encoder 410 of FIG. 4 according to some embodiments of the present invention. As show, the encoder 410 includes a graph generation module 510 to generate a sentence graph 512 from a sentence 402, an attention module 520 to determine word representations 528 for words included in the sentence 402 by applying an attention mechanism, and a representation generation module 530 to determine a sentence representation 412 based on the word representations 528.

The sentence 402 contains a plurality of words. The words in the sentence 402 may be from any natural language and organized in a certain order. Any number of words may be included in the sentence 402. According to embodiments of the present invention, the graph generation module 510 generates the sentence graph 512 based at least in part on syntactic relationships between the words in the sentence 402.

The sentence graph 512 includes nodes represents the words in the sentence 402 and edges connected the nodes. An edge in the sentence graph 512 indicates a relationship between the two words represented by the nodes connected therebetween. The sentence graph 512 include at least one edge indicating a syntactic relationship between the words represented by the nodes connected therebetween, depending on the syntactic relationships between the words. As will be described below, one or more of the edges in the sentence graph 512 may indicate other relationships.

In some embodiments, the sentence graph 512 may be represented as $\mathcal{G}(\mathcal{V}, \varepsilon)$, where $\mathcal{V}$ is a node set and $\varepsilon$ is an edge set. Each node in the node set $\mathcal{V}$ represents a word of the sentence 402. In some embodiments, each node is represented by word embedding of the corresponding word. Word embedding is the collective name for a set of language modeling and feature learning techniques in natural language processing (NLP) where words or phrases from a vocabulary are mapped to vectors of real numbers. Word embedding is used by NLP systems as one mechanism for reasoning over natural language sentences. Each edge in the edge set $\varepsilon$ is a tuple $e_{ij}=(v_i, v_j, r_{ij})$ where $r_{ij}$ is a label for a relationship between the words $v_i$ and $v_j$, and i and j each range from 1 to N with N representing the number of nodes in the sentence 402.

In some embodiments, the sentence graph 512 may be an undirected graph which means that this graph has undirected edges, regardless of the specific relationships between the words. For example, if there is a first relationship from a first word to a second word and a second relationship from the second word to the first word, only one undirected edge is connected between the two nodes representing the first and second words.

The sentence graph 512 $\mathcal{G}(\mathcal{V},\varepsilon)$ can be represented by two matrices, the node feature matrix $X \in \mathbb{R}^{N \times d}$ and an adjacency matrix $A \in \mathbb{R}^{N \times N}$, where N is the number of nodes and d is the dimension of the word embedding represented by the nodes. X and A can be used as the representation of the sentence graph 512 for further processing in the attention module 520 of the encoder 410. In some embodiments, the sentence graph 512 may further be represented by an edge matrix E representing the edge set $\varepsilon$.

In any natural language, words are organized according to certain syntactic relationships. Without considering such syntactic information in computer processing, a sentence is often treated as a linear chain in which the long-dependency relations among the words are hard to get. The graph generation module 510 of the present invention may apply syntactic parsing on the sentence 402 to determine syntactic relationships in the sentence 402. In some embodiments, the graph generation module 510 may utilize syntactic information such as dependency parse tree and/or constituency parse tree to determine the dependency relationships and/or constituent relationships between the words. The structure of the sentence graph 512 varies with different syntactic information and different processes of edges used during the syntactic parsing. For example, different parse trees may generate different graphs.

Various technologies for syntactic parsing can be applied by the graph generation module 510. Some syntactic relationships may be predefined and the graph generation module 510 may determine whether two of the words in the sentence 402 have any of the predefined syntactic relationships by means of the syntactic parsing. Some example predefined dependency relationships may be listed below for purpose of illustration only.

TABLE 1

Example predefined syntactic relationships

| Label | Syntactic Relationship |
| --- | --- |
| aux | Auxiliary |
| auxpass | passive auxiliary |
| cop | Copula |
| arg | argument |
| comp | Complement |
| acomp | adjectival complement |
| ccomp | clausal complement with internal subject |
| xcomp | clausal complement with external subject |
| obj | object |
| dobj | direct object |
| iobj | indirect object |
| pobj | object of preposition |
| subj | subject |
| nsubj | nominal subject |
| nsubjpass | passive nominal subject |
| csubj | clausal subject |
| csubjpass | clausal subject |
| csubjpass | passive clausal subject |
| mod | Modifier |
| amod | adjectival modifier |
| appos | appositional modifier |
| advcl | adverbial clause modifier |

TABLE 1-continued

Example predefined syntactic relationships

| Label | Syntactic Relationship |
| --- | --- |
| det | Determiner modifier |
| ndet | Numeric-determiner modifier |

It should be appreciated that only some examples of dependency relationships are provided above, and more, less, or different dependency relationships may be used to represent the syntactic relationships between the words in the sentence 402.

Figure 6:
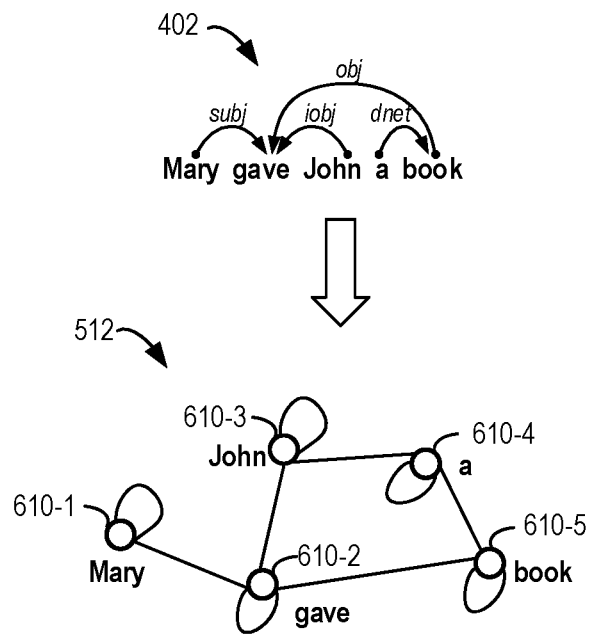
FIG. 6 depicts a schematic diagram of dependency relationships parsed for an example sentence 402 and an example sentence graph 512 generated therefrom.

As a specific example, FIG. 6 illustrates a schematic diagram of dependency relationships parsed for an example sentence 402 and an example sentence graph 512 generated therefrom. In this example, the sentence 402 input to the encoder 410 is "Mary gave John a book." As shown in FIG. 6, the syntactic relationship between the word "Mary" and the word "gave" is a subject relationship (represented by a label "sub"), indicating that the word "Mary" is a subject of the word "gave." The syntactic relationship between the word "gave" and the word "John" is an indirect object relationship (represented by a label "iobj"), indicating that the word "John" is an indirect object of the word "gave." The syntactic relationship between the word "a" and the word "book" is a numeric-determiner modifier relationship (represented by a label "dnet"), indicating that the word "a" is a numeric-determiner modifier of the word "book." Further, the syntactic relationship between the word "gave" and the word "book" is an object relationship (represented by a label "obj"), indicating that the word "book" is an object of the word "gave."

According to the dependency relationships between the words in the sentence 402, the graph generation module 510 may generate a sentence graph 512 as shown in FIG. 6. In this sentence graph, there are nodes 610-1, 610-2, 610-3, 610-4, and 610-5 representing the words "Mary," "gave," "John," "a," "book," respectively. For ease of discussion, the nodes 610-1, 610-2, 610-3, 610-4, and 610-5 may sometime be collectively or individually referred to as nodes 610. There are at least edges connected between the nodes 610-1 and 610-2 representing "Mary" and "gave," the nodes 610-2 and 610-5 representing "gave" and "John," the nodes 610-4 and 610-5 representing "a" and "book," and the nodes 610-2 and 610-5 representing "gave" and "book."

In addition to the syntactic relationships, the graph generation module 510 may further generate the sentence graph 512 to include additional edges representing a sequential relationship and/or a self-relationship. In an embodiment, in generating the sentence graph 512, the graph generation module 510 may construct one or more edges to connect one or more of the nodes itself, respectively. In this case, the tuple of the edge in the edge set $\varepsilon$ is represented as $e_{ij} = (v_i, v_i, \text{'self'})$, where "self" indicates that a self-relationship of the word $v_i$. In some embodiments, the graph generation module 510 may construct the edges for all the nodes in the sentence graph 512 to indicate the self-relationship. As shown in the example sentence graph 512 in FIG. 6, there are edges connecting the node 610 themselves to indicate their self-relationships.

In an embodiment, in generating the sentence graph 512, if the graph generation module 510 determines that there is no syntactic relationship between two words in the sentence 402, this module may further determine whether the two words are adjacent to each other (for example, one word is immediately followed by the other) in the sentence 402. If the two words are adjacent to each other, the graph generation module 510 may construct an edge in the sentence graph 512 to connect two of the nodes representing the two words. This edge may indicate a sequential relationship between the two words. This is because two adjacent words in a sentence are generally important for each other. Still referring to the example shown in FIG. 6, although there is no syntactic relationship between the words "John" and "a," there is still an edge connected between the nodes 610-3 and 610-4 in the sentence graph 512.

Referring back to FIG. 5, the encoder 410 includes the attention module 520 configured to determine word representations 528 for the words in the sentence 502 based on the sentence graph 512. According to embodiments of the present invention, the attention module 520 may determine the word representations 528 for the words by applying an attention mechanism on each of the nodes and its neighbor nodes that are connected with the edges in the sentence graph 512. In some embodiments, the attention module 520 may be implemented as a graph neural network (GNN) which can implement the representation extraction from a graph. More specifically, the attention module 520 may be implemented using an attention-based GNN.

Specifically, the attention module 520 may include a weight determination module 522 and a weight application module 526 which can work together to determine a word representation for each of the words in the sentence 402. For a given node i in the sentence graph 512, the weight determination module 522 is configured to identify from the sentence graph 512 a set of neighbor nodes having edges connected with the given node, which may be represented as $\mathcal{N}_i$. Here, a "neighbor node" is syntactically related to the given node in a syntactic structure of the sentence 402, but may not be necessarily located adjacent to the given node within the sentence.

In some embodiments, the set of neighbor nodes includes those that have edges directly connected with the given node. For example, in the sentence graph 512 illustrated in FIG. 5, for the given node 610-1, its set of neighbor nodes includes this node 610-1 itself (because there is an edge indicating the self-relationship) and the node 610-2 (because of the subj relationship between the corresponding words). For the given node 610-2, its set of neighbor nodes includes the nodes 610-1, 610-2, 610-3, and 610-5 except the node 610-4. The sets of neighbor nodes for other given nodes in the sentence graph 512 may also be identified accordingly.

The weight determination module 522 then applies an attention mechanism on the given node and the set of neighbor nodes to determine respective attention weights 524 for the set of neighbor nodes. The attention weights 524 indicate respective importance of the set of neighbor nodes to the given node. Thus, the attention weights 524 may decide the contributions of the word embeddings of the neighbor nodes to the word representation of the given node. Instead of applying an attention mechanism on every two of the words in a sentence, according to the embodiments of the present invention, the attention mechanism is applied on nodes that have edges connected therebetween in the sentence graph. As such, it is possible to allow every node to attend on only the nodes connected to it and ignore other nodes.

Figure 7A:
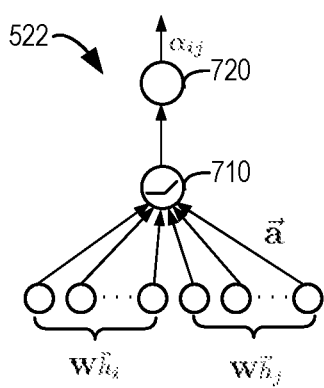
FIG. 7A depicts a schematic diagram of an attention mechanism that can be applied by a weight determination module of FIG. 5 according to an embodiment of the present invention.

Various attention mechanisms that can be used for processing a graph may be applied by the weight determination module 522 and the scope of the embodiments of the present invention is not limited in this regard. FIG. 7A illustrates a schematic diagram of an attention mechanism that can be applied by the weight determination module 522 to determine the attention weights 524. In this example, the weight determination module 522 may include a graph attentional neural network to apply the attention mechanism. As shown, the weight determination module 522 includes an attention application module 710 to apply an attention mechanism and a normalization module 720 to normalize the result of the attention application module 710.

The inputs for the attention application module 710 include the representations of the given node and the set of the neighbor nodes. Each time the attention mechanism is applied to the given node and one of the neighbor nodes. It is supposed that the representation of a given node i (i.e., the word embedding of the corresponding word) is $\vec{h}_i$ and the representation of a neighbor node j is where $\vec{h}_i \in \mathbb{R}^d$, $\vec{h}_j \in \mathbb{R}^d$, d is the dimension of the word embedding, and $j \in \mathcal{N}_i$. The attention weight for the neighbor node j may be determined in the attention application module 710 as:

$$e_{ij} = a(W\vec{h}_i, W\vec{h}_j) \qquad \text{Equation (1)}$$

where $e_{ij}$ indicates the importance of the node j (more specifically, the word embedding represented by the node j) to the node i, a represents a shared attentional mechanism and W is a weight matrix including learnable weights from the training process of the weight determination module 522. The attention application module 710 may similarly determine $e_{ij}$ for other neighbor nodes of the given node i.

In some embodiments, $e_{ij}$ may be directly determined as the attention weight for the neighbor node j. Alternatively, the weight determination module 522 may further include the normalization module 720 to normalize the results $e_{ij}$ across all neighbor nodes of the given node i using a softmax function, which may be represented as:

$$\alpha_{ij} = \text{softmax}_j(e_{ij}) = \frac{\exp(e_{ij})}{\sum_{k \in N_i} \exp(e_{ik})} \qquad \text{Equation (2)}$$

where $\alpha_{ij}$ is the attention weight for the neighbor node j given the node i.

In some embodiments, the attention application module 710 may apply a single-layer feed-forward neural network, parameterized by a weight vector $\vec{a}$ and by applying a nonlinear function (such as a LeakyReLU, a ReLu function, or any other activation function). In this case, the attention weight determined after the normalization module 720 may be represented as:

$$\alpha_{ij} = \frac{\exp(LeakyReLU(\vec{a}^T[W\vec{h}_i \| W\vec{h}_j]))}{\sum_{k \in N_i} \exp(LeakyReLU(\vec{a}^T[W\vec{h}_i \| W\vec{h}_k]))} \qquad \text{Equation (3)}$$

where the superscript T represents transposition and ∥ represents a concatenation operation.

It would be appreciated that although a specific attention mechanism has been described above with reference to FIG. 7A, any other attention mechanism may also be applied by the weight determination module 522 in the encoder 410 of FIG. 5.

The weight determination module 522 may determine the attention weight of the set of neighbor node of each node in the sentence graph 512. Depending on the edges included in the sentence graph 512, the sets of neighbor nodes for different nodes may include different numbers of nodes. The attention weights 524 for a given node i are provided for the weight application module 526.

The weight application module 526 determines a word representation 528 for a given word represented by the given node i at least based on the attention weights and the set of neighbor nodes. In some embodiments, the weight application module 526 may calculate a linear combination of the word embeddings of the neighbor nodes and then apply a nonlinearity function (represented as σ(•)) on the result of the linear combination. For example, the calculation in the weight application module 526 may be represented as:

$$\vec{h}'_i = \sigma\left(\sum_{j \in N_i} \alpha_{ij} W \vec{h}_j\right) \quad \text{Equation (4)}$$

where $\vec{h}'_i \in \mathbb{R}^{d_1}$ represents a word representation 528 for the word corresponding to the given node i and d' represents a dimension of the word representation. The weight application module 526 may determine the word representations for all the words represented by the nodes in the sentence graph 512.

In some embodiments, to stabilize the learning process of the attention neural networks, the weight determination module 522 may apply a multi-head attention mechanism on a given node and its set of neighbor nodes. The multi-head attention mechanism may consist of a plurality of attention mechanisms, each of the attention mechanism being applied on the given node and its set of neighbor nodes in a similar way as described above. The k-th attention mechanism may be represented as $a^k$, which determine an attention weight $\alpha_{ij}^k$ for a neighbor node j of a given node i. The learnable weight matrix used in each attention mechanism may be represented as $W^k$. In different attention mechanisms, the weight vectors and/or the weight matrices may be the same or different.

All the attention weights determined in the multi-head attention mechanisms may be provided to the weight application module 526. The weight application module 526 may determine a first intermediation representation for the given node i based on the attention weights determined in a first attention mechanism and the set of the neighbor nodes for this given node, for example, using Equation (4). The weight application module 526 may further determine a second intermediation representation for the given node i based on the attention weights determined in a second attention mechanism and the set of the neighbor nodes for this given node, for example, using Equation (4). If more than two attention mechanisms are applied, the weight application module 526 may also determine intermediate representation for the given node i accordingly.

Figure 7B:
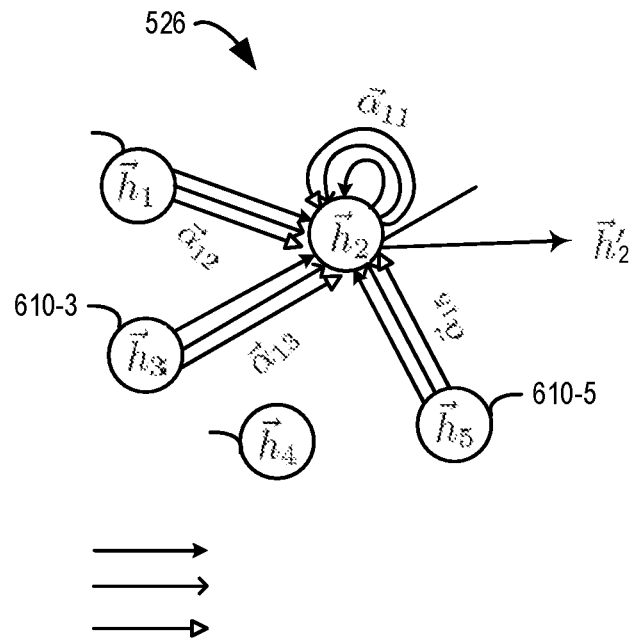
FIG. 7B depicts a schematic diagram of weight application of a multi-head attention mechanism within a weight application module of FIG. 5 according to an embodiment of the present invention.

All the intermediate representations including the first and second intermediate presentations may be aggregated to determine the word representation of the given word corresponding to the give node i. FIG. 7B illustrates a schematic diagram of the weight application of the multi-head attention mechanism in the sentence graph 512 in the example of FIG. 6.

In the example shown in FIG. 7B, the given node is the node 610-2 and 3-head attention mechanism is applied for each node, which means that a first, a second, and a third attention mechanisms are applied. Depending on the sentence graph, the node 610-4 has no contribution to the word representation $\vec{h}'_2$ of the word corresponding to the node 610-2 and thus no attention mechanism is needed on the node 610-4. In each of the attention mechanisms, a corresponding attention weight $\alpha_{ij}^k$ is determined to indicate importance of the node j to the node i.

In some embodiments, the weight application module 526 may concatenate or average the intermediate representations to determine the word representation. In an embodiment of using concatenation, the word representation $\vec{h}'_i$ for the node i may be determined as:

$$\vec{h}'_i = \prod_{k=1}^{K} \sigma\left(\sum_{j \in N_i} \alpha_{ij}^k W^k \vec{h}_j\right) \quad \text{Equation (5)}$$

where K represents the number of attention mechanism to be applied on the node i and ∥ represents a concatenation operation.

In an embodiment of averaging the intermediate representations, the word representation $\vec{h}'_i$ for the node i may be determined as:

$$\vec{h}'_i = \sigma\left(\frac{1}{K}\sum_{k=1}^{K}\sum_{j \in N_i} \alpha_{ij}^k W^k \vec{h}_j\right) \quad \text{Equation (6)}$$

The word representation for each of the words in the sentence 402 may be determined by the attention module 520. All the word representations 528 may be provided for the representation generation module 530. The representation generation module 530 determines, based on the word representations 528, a sentence representation 412 for the sentence 402 for use in a natural language processing task related to the sentence. In some embodiments, the word representations 528 may be organized together to form the sentence representation 412. In some other embodiments, the representation generation module 530 may further process the word representations, for example, by applying one or more other neural network layers. The scope of the embodiments of the present invention is not limited in this regard.

The sentence representation 412 may be utilized in various manners in different natural language tasks, such as by the decoder 420 of the system 400. The utilization of the sentence representation 412 is also not limited in the embodiments of the present invention.

Figure 8:
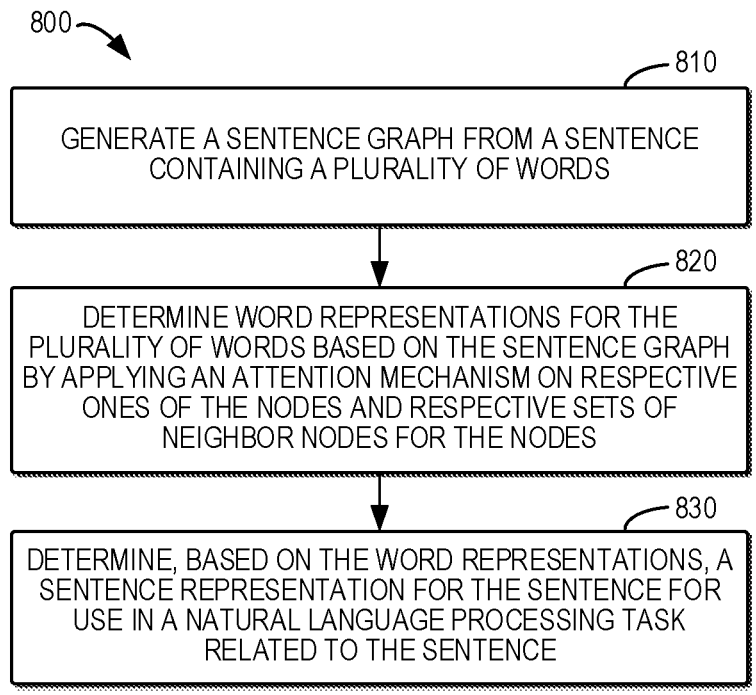
FIG. 8 depicts a flowchart of an example method according to an embodiment of the present invention.

FIG. 8 shows a flowchart of an example method 800 according to an embodiment of the present invention. The method 800 can be implemented at an encoder 410 as shown in FIG. 4. For the purpose of discussion, the method 800 will be described from the perspective of the encoder 410 with reference to FIG. 4.

At block 810, the encoder 410 generates a sentence graph from a sentence containing a plurality of words, the sentence graph comprising nodes representing the plurality of words and edges connecting the nodes, at least one of the edges being constructed to indicate a syntactic relationship between words represented by nodes connected therebetween. At block 820, the encoder 410 determines word representations for the plurality of words based on the sentence graph by applying an attention mechanism on respective ones of the nodes and respective sets of neighbor nodes for the nodes. At block 830, the encoder 410 determines, based on the word representations, a sentence representation for the sentence for use in a natural language processing task related to the sentence.

In some embodiments, generating the sentence graph comprises: in response to lacking of a syntactic relationship between two of the plurality of words, determining, by one or more processors, whether the two words are adjacent to each other in the sentence; and in response to determining that the two words are adjacent to each other, constructing, by one or more processors, an edge in the sentence graph to connect two of the nodes representing the two words, the edge indicating a sequential relationship between the two words.

In some embodiments, generating the sentence graph comprises: constructing, by one or more processors, a further edge to connect one of the nodes itself, the further edge indicating a self-relationship.

In some embodiments, determining the word representations comprises: for a given node of the nodes, applying the attention mechanism on the given node and the set of neighbor nodes for the given node to determine respective attention weights for the set of neighbor nodes, the attention weights indicating respective importance of the set of neighbor nodes to the given node; and determining a word representation for a given word represented by the given node at least based on the attention weights and the set of neighbor nodes.

In some embodiments, determining the word representation for the given word comprises: determining a first intermediate representation for the given word based on the attention weights and the set of neighbor nodes; applying a further attention mechanism on the set of neighbor nodes to determine further attention weights for the set of neighbor nodes, the further attention weights indicating further importance of the set of neighbor nodes to the given node; determining a second intermediate representation for the given word based on the further attention weights and the set of neighbor nodes; and aggregating the first and second intermediate representations to obtain the word representation for the given word.

In some embodiments, wherein a syntactic relationship indicated by an edge of the sentence graph comprises a dependency relationship between two words represented by the nodes connected by the edge.

In some embodiments, the sentence graph is a graph having undirected edges.

In some embodiments, determining the word representations comprises: determining the word representations using a graph neural network.

It should be noted that the natural language processing according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
generating, by one or more processors, a sentence graph from a sentence containing a plurality of words, the sentence graph comprising nodes representing the plurality of words and edges connecting the nodes, comprising:
generating at least one of the edges to indicate a syntactic relationship between words represented by nodes connected therebetween; and
upon determining that two of the plurality of words are not syntactically related and that the two of the plurality of words are adjacent in the sentence, generating at least one of the edges to indicate a sequential relationship between the two words;
determining, by one or more processors, word representations for the plurality of words based on the sentence graph by applying an attention mechanism on respective ones of the nodes and respective sets of neighbor nodes for the nodes, a set of neighbor nodes for a node having edges connected to the node; and
determining, by one or more processors and based on the word representations, a sentence representation for the sentence for use in a natural language processing task related to the sentence.

2. The method of claim 1, wherein generating the sentence graph comprises:
generating, for each respective pair of adjacent words in the sentence, a respective edge indicating a sequential relationship between the respective pair of adjacent words.

3. The method of claim 1, wherein generating the sentence graph comprises:
constructing, by one or more processors, a further edge to connect one of the nodes itself, the further edge indicating a self-relationship.

4. The method of claim 1, wherein determining the word representations comprises: for a given node of the nodes,
applying, by one or more processors, the attention mechanism on the given node and the set of neighbor nodes for the given node to determine respective attention weights for the set of neighbor nodes, the attention weights indicating respective importance of the set of neighbor nodes to the given node; and
determining, by one or more processors, a word representation for a given word represented by the given node at least based on the attention weights and the set of neighbor nodes.

5. The method of claim 4, wherein determining the word representation for the given word comprises:
determining, by one or more processors, a first intermediate representation for the given word based on the attention weights and the set of neighbor nodes;
applying, by one or more processors, a further attention mechanism on the set of neighbor nodes to determine further attention weights for the set of neighbor nodes, the further attention weights indicating further importance of the set of neighbor nodes to the given node;
determining, by one or more processors, a second intermediate representation for the given word based on the further attention weights and the set of neighbor nodes; and
aggregating, by one or more processors, the first and second intermediate representations to obtain the word representation for the given word.

6. The method of claim 1, wherein a syntactic relationship indicated by an edge of the sentence graph comprises a dependency relationship between two words represented by the nodes connected by the edge.

7. The method of claim 1, wherein the sentence graph is a graph having undirected edges.

8. The method of claim 1, wherein determining the word representations comprises:
determining, by one or more processors, the word representations using a graph neural network.

9. A system comprising:
a processing unit; and
a memory coupled to the processing unit and storing instructions thereon, the instructions, when executed by the processing unit, performing acts comprising:
generating a sentence graph from a sentence containing a plurality of words, the sentence graph comprising nodes representing the plurality of words and edges connecting the nodes, comprising:
generating at least one of the edges to indicate a syntactic relationship between words represented by nodes connected therebetween; and
upon determining that two of the plurality of words are not syntactically related and that the two of the plurality of words are adjacent in the sentence, generating at least one of the edges to indicate a sequential relationship between the two words;
determining word representations for the plurality of words based on the sentence graph by applying an attention mechanism on respective ones of the nodes and respective sets of neighbor nodes for the nodes, a set of neighbor nodes for a node having edges connected to the node; and
determining, based on the word representations, a sentence representation for the sentence for use in a natural language processing task related to the sentence.

10. The system of claim 9, wherein generating the sentence graph comprises:
generating, for each respective pair of adjacent words in the sentence, a respective edge indicating a sequential relationship between the respective pair of adjacent words.

11. The system of claim 9, wherein generating the sentence graph comprises:
constructing a further edge to connect one of the nodes itself, the further edge indicating a self-relationship.

12. The system of claim 9, wherein determining the word representations comprises: for a given node of the nodes,
applying the attention mechanism on the given node and the set of neighbor nodes for the given node to determine respective attention weights for the set of neighbor nodes, the attention weights indicating respective importance of the set of neighbor nodes to the given node; and
determining a word representation for a given word represented by the given node at least based on the attention weights and the set of neighbor nodes.

13. The system of claim 12, wherein determining the word representation for the given word comprises:
determining a first intermediate representation for the given word based on the attention weights and the set of neighbor nodes;
applying a further attention mechanism on the set of neighbor nodes to determine further attention weights for the set of neighbor nodes, the further attention weights indicating further importance of the set of neighbor nodes to the given node;
determining a second intermediate representation for the given word based on the further attention weights and the set of neighbor nodes; and
aggregating the first and second intermediate representations to obtain the word representation for the given word.

14. The system of claim 9, wherein a syntactic relationship indicated by an edge of the sentence graph comprises a dependency relationship between two words represented by the nodes connected by the edge.

15. The system of claim 9, wherein the sentence graph is a graph having undirected edges.

16. The system of claim 9, wherein determining the word representations comprises:
determining the word representations using a graph neural network.

17. A computer program product, the computer program product comprising a computer readable storage medium having program instructions embodied therewith, the program instructions executable by an electronic device to cause the electronic device to perform acts of:
generating a sentence graph from a sentence containing a plurality of words, the sentence graph comprising nodes representing the plurality of words and edges connecting the nodes, comprising:
generating at least one of the edges to indicate a syntactic relationship between words represented by nodes connected therebetween; and
upon determining that two of the plurality of words are not syntactically related and that the two of the plurality of words are adjacent in the sentence, generating at least one of the edges to indicate a sequential relationship between the two words;
determining word representations for the plurality of words based on the sentence graph by applying an attention mechanism on respective ones of the nodes and respective sets of neighbor nodes for the nodes, a set of neighbor nodes for a node having edges connected to the node; and
determining, based on the word representations, a sentence representation for the sentence for use in a natural language processing task related to the sentence.

18. The computer program product of claim 17, wherein generating the sentence graph comprises:
generating, for each respective pair of adjacent words in the sentence, a respective edge indicating a sequential relationship between the respective pair of adjacent words.

19. The computer program product of claim 17, wherein determining the word representations comprises: for a given node of the nodes,
applying the attention mechanism on the given node and the set of neighbor nodes for the given node to determine respective attention weights for the set of neighbor nodes, the attention weights indicating respective importance of the set of neighbor nodes to the given node; and
determining a word representation for a given word represented by the given node at least based on the attention weights and the set of neighbor nodes.

20. The computer program product of claim 19, wherein determining the word representation for the given word comprises:
determining a first intermediate representation for the given word based on the attention weights and the set of neighbor nodes;
applying a further attention mechanism on the set of neighbor nodes to determine further attention weights for the set of neighbor nodes, the further attention weights indicating further importance of the set of neighbor nodes to the given node;

determining a second intermediate representation for the given word based on the further attention weights and the set of neighbor nodes; and aggregating the first and second intermediate representations to obtain the word representation for the given word.

\* \* \* \* \*